US012372425B2

(12) United States Patent
Delaporte et al.

(10) Patent No.: US 12,372,425 B2
(45) Date of Patent: Jul. 29, 2025

(54) METHOD AND DEVICE FOR CHECKING THE TIGHTENING TENSION OF A FASTENING BOLT FOR FASTENING AERONAUTICAL PARTS

(71) Applicant: SAFRAN AIRCRAFT ENGINES, Paris (FR)

(72) Inventors: Nicolas Daniel Delaporte, Moissy-Cramayel (FR); Adeline Isabelle Anne-Marie Houssaye, Moissy-Cramayel (FR); Arnaud Martine, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 307 days.

(21) Appl. No.: 17/996,154

(22) PCT Filed: Apr. 13, 2021

(86) PCT No.: PCT/FR2021/050651
§ 371 (c)(1),
(2) Date: Oct. 13, 2022

(87) PCT Pub. No.: WO2021/214401
PCT Pub. Date: Oct. 28, 2021

(65) Prior Publication Data
US 2023/0194371 A1    Jun. 22, 2023

(30) Foreign Application Priority Data
Apr. 20, 2020    (FR) ........................................ 2003931

(51) Int. Cl.
*G01L 5/24*    (2006.01)
*B64F 5/60*    (2017.01)

(52) U.S. Cl.
CPC ................ *G01L 5/246* (2013.01); *B64F 5/60* (2017.01)

(58) Field of Classification Search
USPC ...................................................... 73/862.381
See application file for complete search history.

(56) References Cited

U.S. PATENT DOCUMENTS 3,242,725 A * 3/1966 Carrie ........................ G01L 5/24
411/548
3,759,090 A * 9/1973 McFaul ................... G01L 5/246
73/806

(Continued)

FOREIGN PATENT DOCUMENTS

DE        0467262 A1 * 1/1992
DE    102015111826 A1    1/2017

(Continued)

OTHER PUBLICATIONS

International Search Report received for PCT Patent Application No. PCT/FR2021/050651, mailed on Jul. 19, 2021, 6 pages (2 pages of English Translation and 4 pages of Original Document).

*Primary Examiner* — Clayton E. LaBalle
*Assistant Examiner* — Warren K Fenwick
(74) *Attorney, Agent, or Firm* — WOMBLE BOND DICKINSON (US) LLP (57) ABSTRACT

A method for checking the tightening tension of at least one fastening bolt for fastening at least two aeronautical parts, wherein it includes the steps of mounting a centering device on a head of a screw of the bolt, the centering device including an aperture aligned with an axis of the screw; engaging one end of a sensor in the aperture of the device until this end is in contact with the head of the screw; checking at least one physical parameter of the bolt by the (Continued)

sensor, this parameter being representative of the tightening tension of the bolt; then removing the centering device.

9 Claims, 6 Drawing Sheets

(56) References Cited

U.S. PATENT DOCUMENTS

| | | | | |
|---|---|---|---|---|
| 3,810,385 | A * | 5/1974 | McFaul | G01B 17/04 |
| | | | | 73/629 |
| 4,333,351 | A * | 6/1982 | Bickford | G01L 1/255 |
| | | | | 73/761 |
| 4,413,518 | A * | 11/1983 | Jones | G01B 17/04 |
| | | | | 73/615 |
| 5,058,439 | A * | 10/1991 | Carpenter | B25B 23/14 |
| | | | | 73/761 |
| 5,699,703 | A | 12/1997 | Habele | |
| 10,240,992 | B2 * | 3/2019 | Skirke | G01L 1/255 |
| 2012/0191378 | A1 * | 7/2012 | Chu | G01L 25/003 |
| | | | | 702/41 |
| 2016/0229037 | A1 | 8/2016 | Quigley | |
| 2017/0023529 | A1 * | 1/2017 | Skirke | G01N 29/223 |

FOREIGN PATENT DOCUMENTS

| | | | |
|---|---|---|---|
| EP | 0467262 A1 | | 1/1992 |
| FR | 3056746 A1 | | 3/2018 |
| JP | H03166024 A | * | 7/1991 |
| PL | 168670 B1 | * | 3/1996 |
| WO | 95/22009 A1 | | 8/1995 |

* cited by examiner

METHOD AND DEVICE FOR CHECKING THE TIGHTENING TENSION OF A FASTENING BOLT FOR FASTENING AERONAUTICAL PARTS

TECHNICAL FIELD OF THE INVENTION

The present invention relates to a method for checking the tightening tension of a fastening bolt and to a device allowing this check, in particular for the aeronautical industry.

TECHNICAL BACKGROUND

The prior art comprises the documents DE-A1-2015111826, WO-A1-95/22009, FR-A1-3056746 and U.S. Pat. No. 5,699,703.

Figure 1:
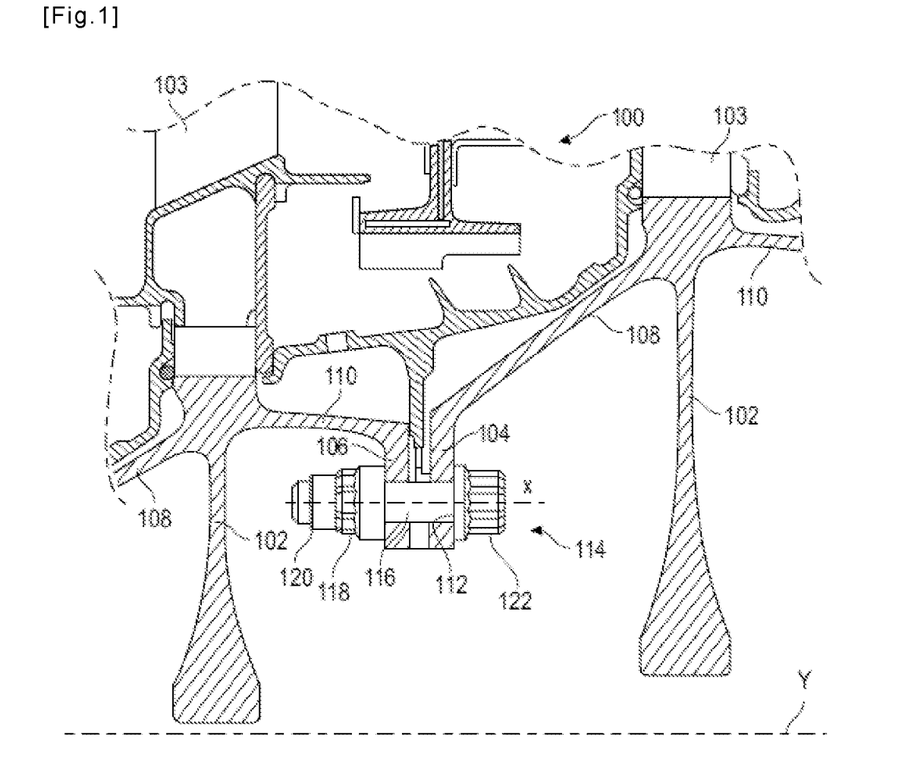
FIG. 1 is a schematic cross-sectional half-view of a turbine segment of an aircraft turbomachine.

It is well known in the prior art, in particular as explained in the document FR-A1-3 019 584, that in the aeronautical industry, an aircraft turbomachine is made up of several portions or modules and in particular a low or high pressure turbine, itself comprising one or more stages, each consisting of a row of stator vanes followed by a row of rotor vanes. An example of a turbine segment 100 is shown in FIG. 1.

The rotor generally comprises a number of discs 102, centred on an axis of rotation Y and carrying vanes 103, which are fastened to each other by flanges 104, 106 which may be placed upstream and/or downstream of the discs 102. For example, each disc 102 is connected by an upstream frustoconical wall 108 to a flange 104 and by a downstream frustoconical wall 110 to a flange 106. The flanges 104, 106 extend radially with respect to the axis Y of the turbine 100.

To fasten two discs 102 together, the flanges of these discs are applied axially to each other and comprise aligned orifices 112 for mounting bolts 114 which ensure the fastening of the flanges by tightening them axially against each other.

Figure 2:
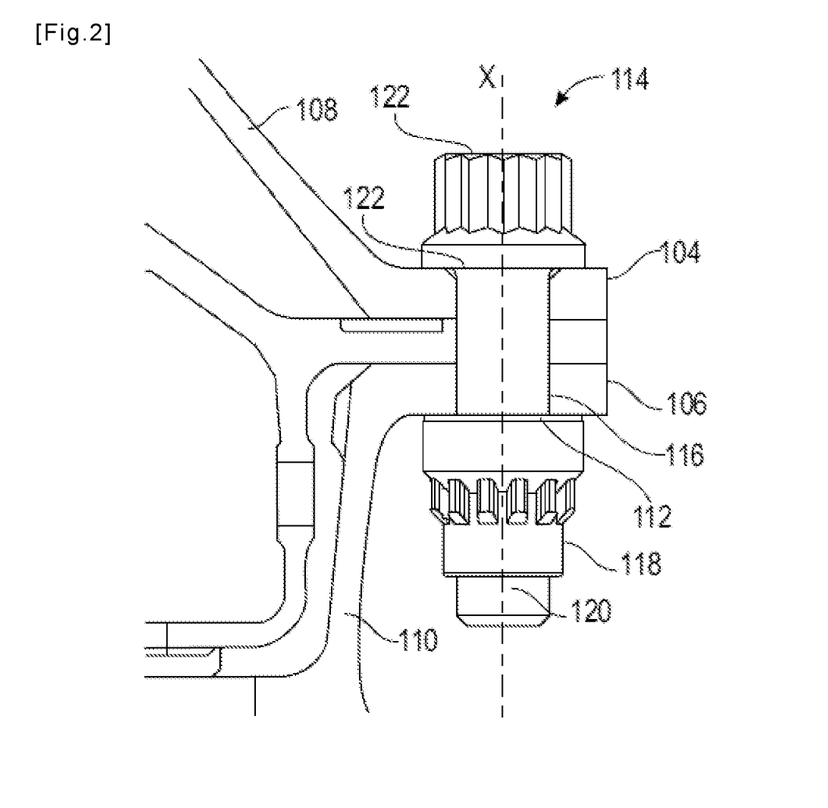
FIG. 2 is a schematic cross-sectional view of a fastening bolt.

In the present application, bolt 114 means an assembly comprising a screw 116 and a nut 118, aligned along an axis X, parallel to the axis Y of rotation of the turbine. FIG. 2 shows in detail an example embodiment of such an assembly.

Typically, a screw 116 comprises a threaded rod 120, one end of which is connected to a head 122. The threaded rod 120 of the screw 118 is intended to pass through the orifices 112 of the flanges until the head 122 is axially supported on one of the flanges. The nut 118 is screwed onto the free end of the threaded rod 120 until it rests on the flange opposite the head 122.

In the aeronautical industry, a nut or a bolt must be tightened to a predetermined torque to ensure that the flanges are tight and do not accidentally come disengage during operation. A defect to tighten would be problematic as it could lead to a malfunction of the turbomachine and thus to a failure of the aircraft equipped with it.

To prevent this from happening, each bolt is tightened to a desired torque that is calculated during the development of the mechanical assembly. The tightening torque is determined from the tension in the screw of the bolt. The tightening is then usually performed precisely with a torque wrench to the desired torque during production.

It is therefore important to perform a careful check of a tightening, and in particular a check of the tension of the screws. In general, a screw tightening generates normal and shear stresses with respect to the tightening plane. The tightening tension of a screw corresponds to this normal stress and must be below a predetermined threshold.

In the prior art, this check is performed by a manual method that is difficult to reproduce and therefore unreliable. One of the methods used consist in using a measurement sensor for measuring the tension of the screw of the bolt after tightening.

However, the position of the sensor on the bolt is important to obtain a reliable and accurate measurement of the tightening tension and this position is not guaranteed in the prior art because the sensor used is not necessarily suitable for this measurement on a bolt. The current technique does not therefore allow us to obtain usable results. This difficulty can be amplified when the access to the bolt is complex with the sensor due to the environment making it difficult to handle a sensor in this area. This makes it difficult for an operator to repeatedly and reliably perform this check.

SUMMARY OF THE INVENTION

The present invention is intended to remedy these disadvantages and relates to a simple and effective checking method and centering device allowing its implementation.

The invention thus proposes a method for checking the tightening tension of at least one bolt for fastening at least two aeronautical parts, characterised in that it comprises the steps consisting in:
   a) mounting a centering device on a head of a screw of the bolt, this centering device comprising an orifice aligned with an axis of the screw;
   b) engaging one end of a sensor in the orifice of the device until that end contacts the head of the screw;
   c) checking at least one physical parameter of the bolt by means of said sensor, this parameter being representative of the tightening tension of the bolt; and then
   d) removing the centering device,
the method comprising, between the steps of mounting the device and of engaging the sensor, a step of applying a coupling liquid to the head of the screw, an excess of coupling liquid is evacuated through an orifice of the device during the step of engaging the sensor.

Thus, the invention ensures that it is easy for an operator to check a bolt. This is because the sensor is held in position relative to the screw by the device, allowing the operator to avoid mispositioning the sensor relative to the bolt or sliding it over the bolt to be check. In addition, the device used allows for more consistent and uniform test conditions, which ensures an increased reliability and repeatability of the checking of the tightening tension.

The method according to the invention may comprise one or more of the following characteristics, taken alone or in combination with each other:
   the sensor is an ultrasonic transducer;
   in the step of engaging the sensor, the end of the sensor is applied with a predetermined pressure to the screw head, for example by means of at least one elastic member fastened to the device and bearing on the sensor;
   the parts are rotor discs of an aircraft turbomachine, these discs comprising annular flanges applied to each other and comprising aligned orifices for mounting bolt which are checked one after the other; and the physical parameter is a mechanical stress or strain.

The present invention also relates to a centering device allowing to implement a checking method as described above, characterised in that it comprises a body comprising a housing configured to receive a head of a screw of a bolt, this housing extending along an axis and comprising an axial extension forming an orifice configured to receive an end of a sensor for checking the tightening tension of this bolt, the body comprising a transverse orifice opening into the housing and configured to allow an excess of coupling liquid to pass through during a check.

The centering device according to the invention may comprise one or more of the following characteristics, taken alone or in combination with each other:
- the body is formed in one part, preferably made of elastically deformable material;
- the body has an annular or cylindrical shape, the axis being coincident with an axis of revolution of the body;
- the body is generally elongated and comprises the housing substantially in the middle;
- the body comprises at its longitudinal ends:
  - hooks for fastening an elastic member configured to bear on the sensor, and/or
  - parallel locator pins intended to cooperate with the parts fastened by the bolt;
- the hooks are located on a first flat face of the body and the pins are located on a second opposite flat face of the body.

BRIEF DESCRIPTION OF THE FIGURES

Further characteristics and advantages of the invention will become apparent from the following detailed description, for the understanding of which reference is made to the attached drawings in which.

DETAILED DESCRIPTION OF THE INVENTION

In the following description, it is clarified that the method for checking the tightening tension of a bolt and the use of the device allowing this must be performed on a turbomachine module, and for example a turbine, positioned in a flat position. In other words, the module is tilted so that the rotational axis Y of the rotor is vertical.

Although the example described relates to a turbine, it is clear that this example is not limiting and therefore the checking method and the checking device is applicable to other environments or modules of the turbomachine, such as in a compressor for example.

FIGS. 1 and 2 have been described above.

The applicant has developed a centering device which allows a sensor to be centred for performing a tightening tension check on a fastening bolt described above.

Figure 3:
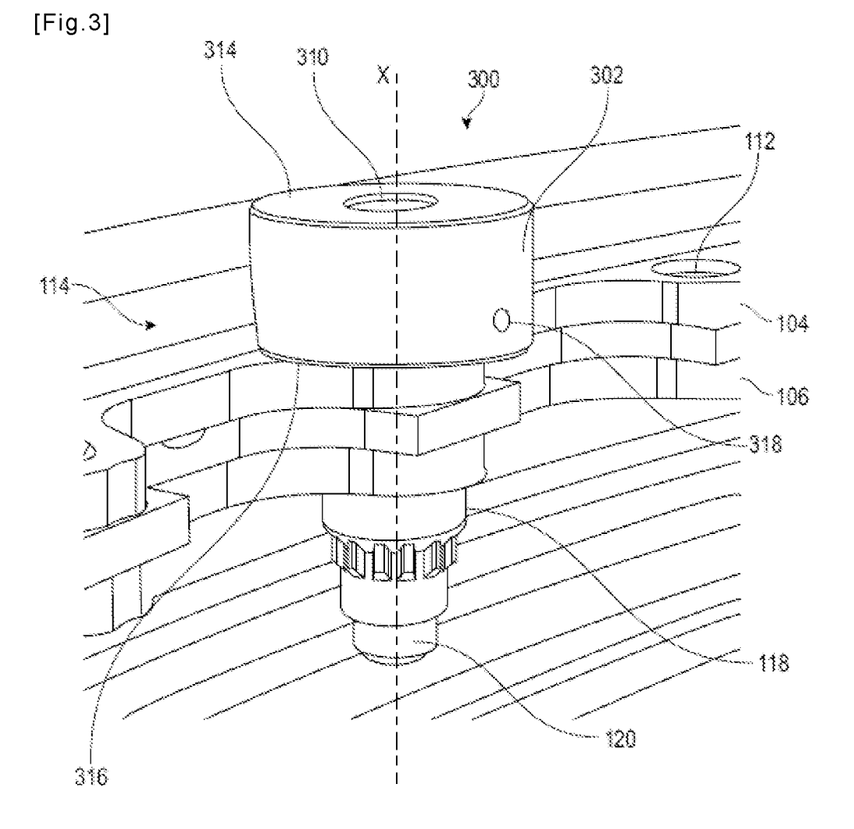
FIG. 3 is a schematic perspective view of a fastening bolt with a centering device on top of it for implementing the method for checking the tightening tension, according to a first embodiment.
Figure 4A:
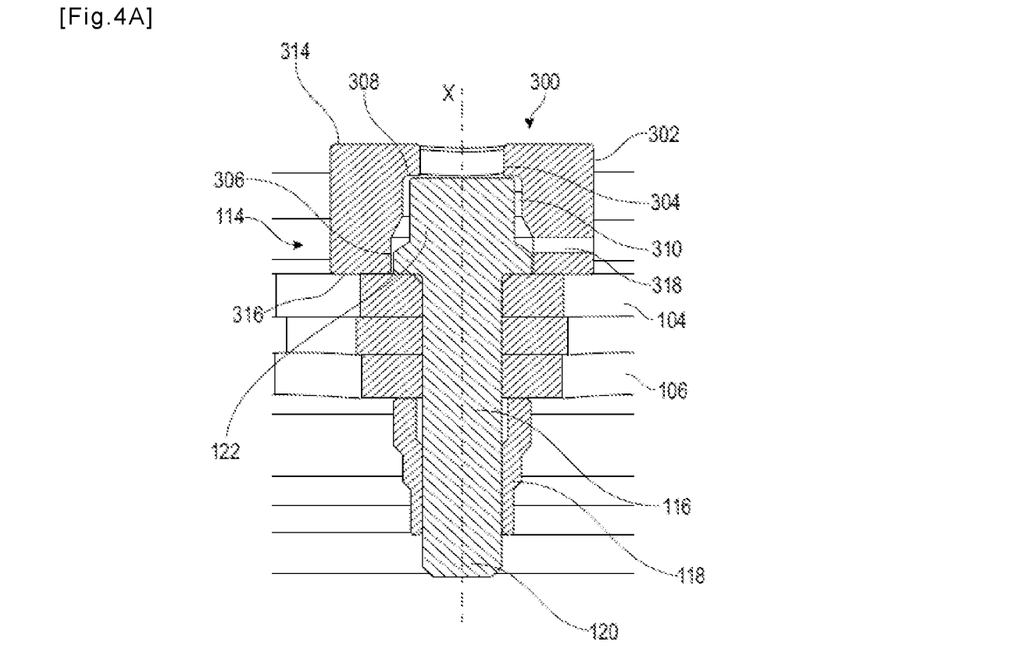
FIG. 4A is a schematic cross-sectional view of the device and the bolt of FIG. 3.
Figure 4B:
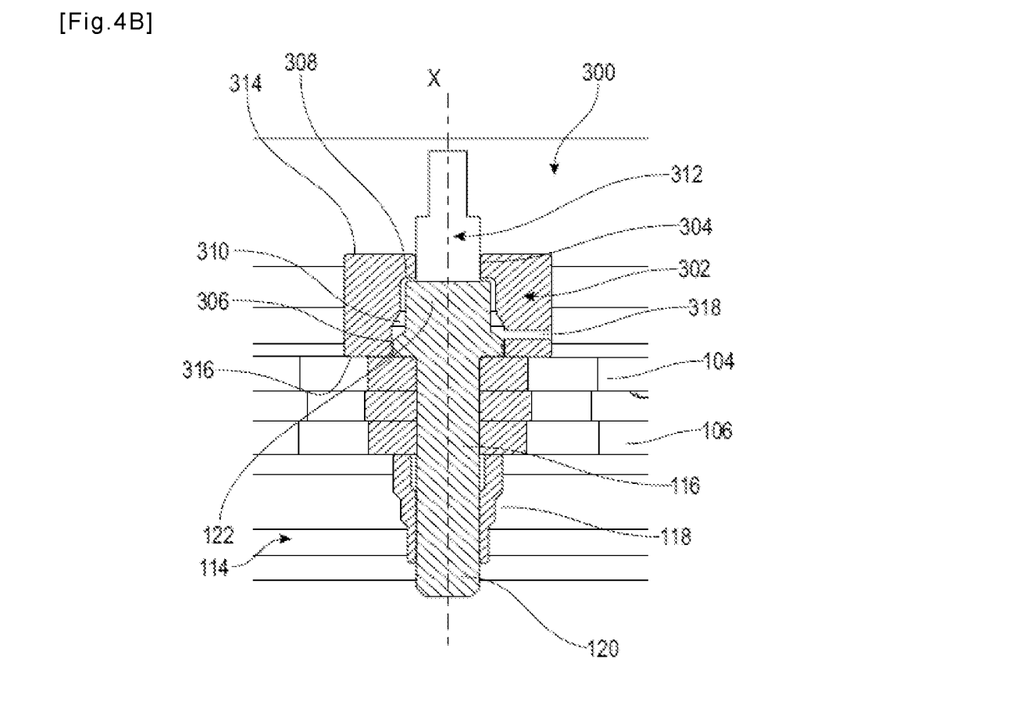
FIG. 4B is a similar view to FIG. 4A and shows a step in a checking method during which a sensor is introduced into the centering device.

Reference is now made to FIGS. 3, 4A and 4B which show a first embodiment of the centering device 300 sleeved to the head 122 of the screw 116 of the fastening bolt 114. The elements of FIGS. 3, 4A and 4B, which have already been described with reference to FIGS. 1 and 2, are designated by the same references.

In this embodiment, the body 302 of the device 300 is monobloc. The reusable body 302 is for example made of an elastically deformable material such as an elastomer or a rubber.

The body 302 has a recessed portion, extending along an axis X and having a generally cylindrical and staged shape, which is open at both ends. This recessed portion comprises different segments: a proximal or upper segment 304 and a distal or lower segment 306. The proximal segment 304 has a diameter substantially smaller than the diameter of the distal segment 306. The junction of the proximal 304 and distal 306 segments forms a shoulder 308 which rests on the screw head 122 once the device 300 is mounted on the bolt 114.

The recessed portion of the body defines a housing 310 configured to receive the screw head 122 of the bolt 114 in its distal segment 306 and to receive an end of a sensor 312 for checking the tightening tension of the bolt 114 in its proximal segment 304. The housing 310, as formed, allows the device 300 to be sleeved over the screw head 122 and held it thereon such that the device 300 is secured to the screw head 122. It is therefore understood that, for an easy fastening to the bolt 114, the diameter of the distal segment 306 is substantially greater than or equal to the maximum diameter of the screw head 122. Similarly, the diameter of the proximal segment 304 is substantially equal to or greater than the diameter of the end of the sensor 312.

In one variant, the diameter of the distal segment 306 may be slightly smaller than the diameter of the head 122. It is then understood that the walls of the distal segment 306 can elastically deform to hold the screw head 122 tightened.

The device 300 is intended to be mounted and removed manually by a user.

In one variant, the diameter of the proximal segment 304 may be slightly smaller than the diameter of the end of the sensor 312. It is then understood that the walls of the proximal segment 304 can elastically deform to hold the end of the sensor 312 tightened.

The sensor 312 is intended to be engaged in the device and removed manually by a user.

Furthermore, the deformation of the body 302 allows the device 300 to be adapted to different types of screw heads and also allows the device 300 to be adapted to the environment in which the bolt 114 is located, in particular in the case where the bolt 114 is close to a part with a large spatial overall dimension. In such a case, the body 302 can elastically deform to adapt to its immediate environment.

The body 302 also comprises an upper face 314 and a lower face 316, the upper face 314 being on the side of the proximal segment 304 and the lower face 316 on the side of the distal segment 306. The lower face 316 can contact the surface of the flange 104.

An orifice 318 extending along a transverse axis, substantially perpendicular to the axis of the housing 310, connects the recessed portion of the body to the exterior. This orifice 318 allows the evacuation of an excess of coupling liquid used during the check of the tightening tension. Indeed, the insertion of the sensor 312 into the housing 310 of the body 302 of the device 300 tends to compress the fluid located between the sensor 312 and the head of the screw 122. The fluid excess, not required for proper check of the tightening tension, can then be evacuated through the orifice 318.

In the aeronautical industry, the flanges 104, 106 allowing the assembly of the discs may be scalloped. A scalloped flange, in contrast to a conventional flange, comprises alternation of solid portions and recessed portions, extending radially with respect to the axis Y of the turbine. A scalloped flange 104, 106 allows in particular a gain in material and, consequently, a gain in the final mass of the turbomachine. In such a case, the surface area surrounding the orifice 112 intended to receive the bolt 114 is reduced. The support on which the centering device 300 bears is therefore also reduced, which reduces the stability of the device.

A second embodiment of the device allows to solve this problem.

Figure 5:
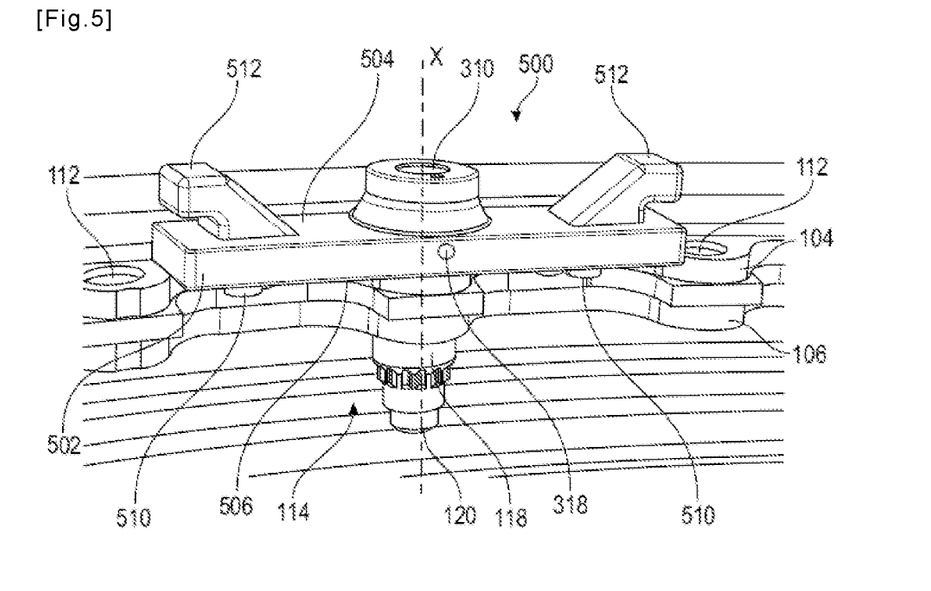
FIG. 5 is a perspective view of a fastening bolt with a centering device on top of it for implementing the method for checking the tightening tension, according to a second embodiment.
Figure 6:
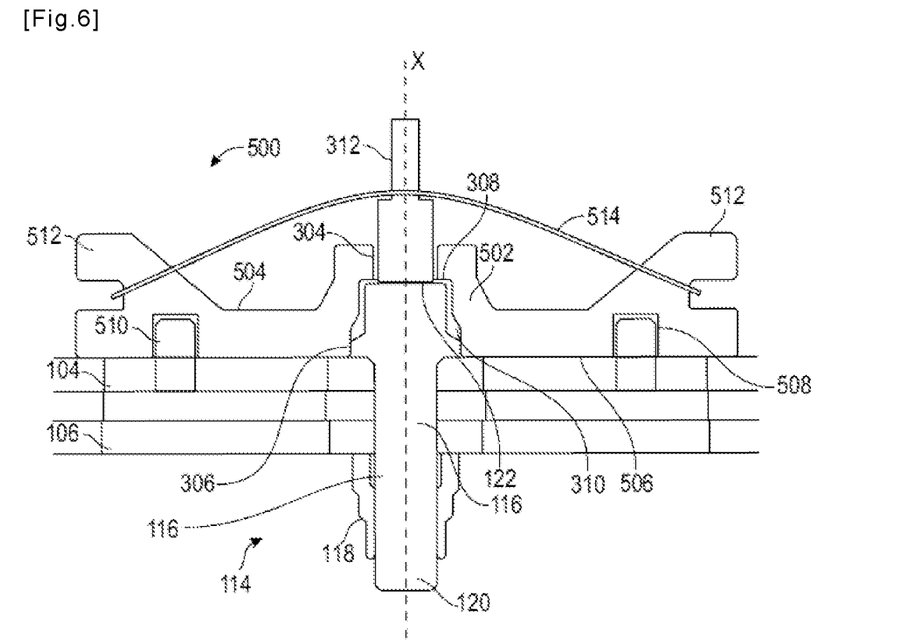
FIG. 6 is a schematic cross-sectional view of the bolt and the device of FIG. 5, and further illustrates a step in a checking method in which a sensor is introduced into the centering device.

Reference is now made to FIGS. 5 and 6 which show a second embodiment of the centering device 500 sleeved to the head 122 of the screw 116 of a fastening bolt 114. The elements of FIGS. 5 and 6 which have already been described with reference to the previous figures are designated by the same references.

In this embodiment, the body 502 of the device 500 is monobloc and has a generally elongated shape. The body 502 of the device 500 may be made of an elastically deformable material such as an elastomer or a rubber. The device 500 is also reusable.

The elongated shape of the device 500 allows to improve its stability when used on a scalloped flange. Indeed, the ends of the body 502 can then rest on the edges of the orifices 112 adjacent to the bolt 114 of interest.

The body 502 further comprises a first upper flat face 504 and a second lower flat face 506, opposite the first flat face 504. It comprises, substantially in the middle, a recessed portion having the same characteristics as the recessed portion described above for the first embodiment of FIGS. 3, 4A and 4B, which also allows the device 500 to be sleeved onto the screw head 122 of a bolt 114. This recessed portion therefore defines the housing 310.

The body 502 also comprises an orifice 318 for evacuating a liquid excess as described above.

The body 502 comprises recesses 508 located substantially at the ends of the body 502 on the lower face 506. These recesses 508 are configured to receive locator pins 510 such that one end of each pin 510 protrudes from the lower face 506.

These locator pins 510 are configured to cooperate with the scalloped flanges and in particular for the projecting ends to cooperate with the lateral edges of the recessed portions of the scalloped flange 104, 106. In this way, the rotation of the centering device 502 is limited and its stability improved.

The locator pins 510 are also removable. This has the advantage of allowing the device 502 to be used whether or not the flanges 104, 106 are scalloped.

In one embodiment, the pins 510 and the body 502 may be monobloc.

The body 502 further comprises fastening hooks 512 substantially located at its longitudinal ends on the upper face 504. These hooks 512 allow the fastening of at least one elastic member 514, such as a rubber band, configured to rest on the sensor 312 once it has been inserted into the housing of the body 502 (as shown in FIG. 6).

The elastic member 514, which has a predetermined return force, is fastened to the two hooks 512 so as to be tensioned. In use, the elastic member 514 presses on the sensor 312 to apply a constant and uniform pressure throughout its use so that the end of the sensor contacts the screw head 122. The elastic member 514 is also removable and interchangeable. It can therefore be easily replaced in case of wear or breakage.

The advantage of this elastic member 514 is that it replaces the operator in applying pressure to the sensor 312 during the check of the tightening tension. This characteristic is particularly useful when the overall dimension at the level of the bolt 114 is too large for the operator to place and press the sensor 312. In addition, the use of the elastic member 514 ensures an increased repeatability of the check of the tightening tension.

The applicant has also 9 developed a method for checking the tightening tension of a bolt fastening at least two rotor disc flanges of an aircraft turbomachine. This method allows the tightening tension of the screw of the bolt to be checked.

Figure 7:
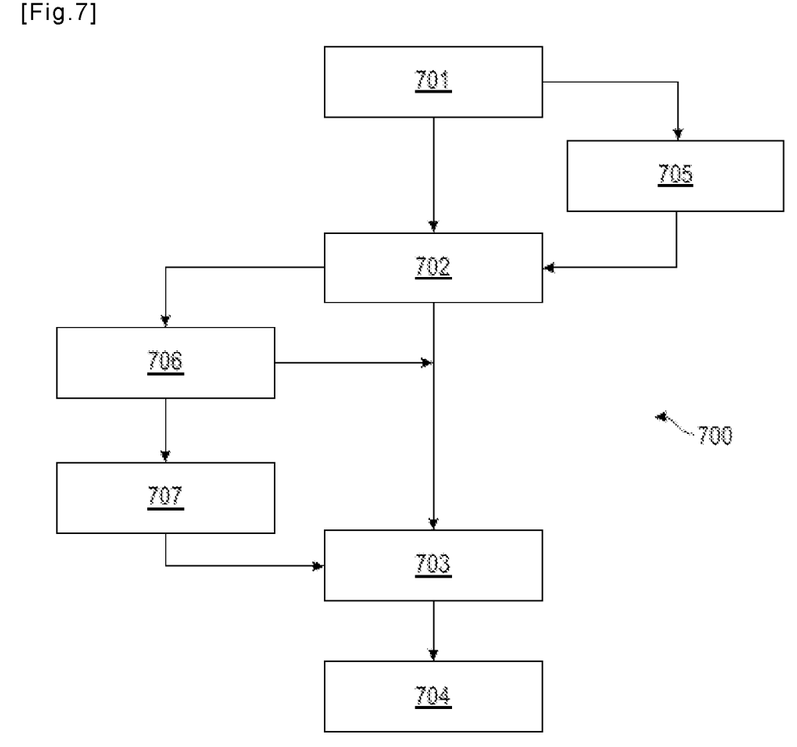
FIG. 7 is a block diagram illustrating steps in an embodiment of the method for checking the tightening tension.

Reference is now made to FIG. 7 showing the steps of the method 700 implemented by means of a centering device 300, 500 as described above.

In a step 701, the centering device 300, 500 is sleeved to a screw head 122 so as to be secured to a bolt 114.

In a step 702, the end of a sensor 312 is inserted into the housing 310 of the body 302, 502 of the device 300, 500 provided for this purpose. The end of the sensor 312 is inserted until it contacts the head 122 of the screw 116 of the bolt 114. This sensor 312 may, among other things, be an ultrasonic transducer.

In a step 703, at least one physical parameter of the bolt 114 is checked by the sensor 312. This physical parameter can either give a direct value of the tightening tension or it can give a representative quantity, allowing the tightening tension to be estimated. In the case of an ultrasonic transducer, ultrasonic is emitted through the screw 116 to determine the tightening tension of the bolt 114. The measured tightening tension can then be compared with the desired tightening tension.

More precisely, a mechanical stress $\sigma$ of the screw 116 is determined from the strain $\varepsilon$ and the Young's modulus E or modulus of elasticity via the Hooke's law ($\sigma = E \times \varepsilon$). The deformation $\varepsilon$ is obtained from measurements of the time of a round trip of a wave, before tightening and after tightening the bolt 114. The Young's modulus E is a constant associated with the material of the screw 116.

In a step 704, the sensor 312 is disengaged from the centering device 300, 500 and the device 300, 500 is dismounted from the bolt 114.

At the end of this sequence of steps, the method 700 can be repeated with the same centering device 300, 500 on another bolt 114. The method 700 can thus be performed to meet a specific need or can be performed in series, on all the turbomachines of a production line.

It should be noted that the method 700 may be interrupted at any time to lead to the step 704. It should also be noted that the different steps are not limited in time.

Additional steps can be added to the above steps to improve the check of the tightening tension.

Thus, in a step 705, which is inserted between the steps 701 and 702, a liquid product or coupling liquid may be poured into the housing 310 of the body 302, 502 of the device 300, 500 so as to cover the screw head 122. This liquid is useful to ensure a transmission of the waves towards the screw 116.

In a step 706, following the step 702, a constant and uniform pressure is exerted on the sensor 312 to hold it in place, on the one hand, and, on the other hand, to be able to subsequently recover usable and comparable results obtained in the step 703.

The pressure on the sensor 312 may be exerted manually or by means of an elastic member 514 resting on the sensor 312.

It will be noted that the pressure on the sensor 312 must remain constant and uniform until the step 704 of dismounting the device 300, 500.

In a step 707, inserting after the step 702 or after the step 706, the excess of coupling liquid is evacuated through an orifice 318 connecting the housing 310 configured to receive the screw head 122. The evacuation of the liquid is due to the compression of the liquid between the screw head 122 and the end of the sensor 312. The excess liquid is evacuated, as well as the air bubbles, allowing for more reliable results.

The previously described embodiments have the advantage of improving the holding of a sensor over a screw head of a bolt to be checked. Indeed, the solutions provided allow a user to performed simple, reliable and repeatable operations to check the tightening tension of a bolt for fastening aeronautical parts.

The device implemented in these different embodiments also allows for a gain in productivity. In fact, the device described above allows the user to gain in precision during the check and/or measurements, and therefore to eliminate additional verification steps in case of doubt about the reliability of a measurement.

The invention claimed is:

1. A method for checking a tightening tension of at least one fastening bolt for fastening at least two aeronautical parts, wherein the method comprises the steps of:
   a) mounting a centering device on a head of a screw of the bolt, the centering device comprising a first axial orifice aligned with an axis of the screw;
   b) applying a coupling liquid to the head of the screw;
   c) engaging one end of a sensor in the first axial orifice of the device until said one end contacts the head of the screw, and evacuating an excess of the coupling liquid through a second transverse orifice of the device, said second transverse orifice opening into said first axial orifice;
   d) checking at least one physical parameter of the bolt by means of said sensor, said parameter being representative of the tightening tension of the bolt; then
   e) removing the centering device.

2. The method of claim 1, wherein the sensor is an ultrasonic transducer.

3. The method according to claim 1, wherein, in the step b), the end of the sensor is applied with a predetermined pressure to the head of the screw, for example by means of at least one elastic member fastened to the device and bearing on said sensor.

4. The method according to claim 1, wherein the parts are rotor discs of an aircraft turbomachine, these discs comprising annular flanges applied to each other and comprising aligned orifices for mounting bolts which are checked one after the other.

5. A centering device for implementing the method according to claim 1, wherein the centering device comprises a body comprising a housing configured to receive a head of a screw of a bolt, this housing extending along an axis and comprising an axial extension forming a first axial orifice configured to receive an end of a sensor for the check of the tightening tension of this bolt, the body comprising a second transverse orifice opening into said housing or first axial orifice and configured to allow an excess of coupling liquid to pass through during a check.

6. The device according to claim 5, wherein the body is formed in one part, preferably of elastically deformable material.

7. The device according to claim 6, wherein the body has an annular or cylindrical shape, said axis being coincident with an axis of revolution of the body.

8. The device of claim 7, wherein the body is generally elongated and comprises said housing substantially in the middle.

9. The device according to claim 8, wherein the body comprises at its longitudinal ends:
   hooks for fastening an elastic member configured to bear on said sensor, and/or
   parallel locator pins intended to cooperate with the parts fastened by said bolt.

* * * * *